US 6,570,613 B1

(12) United States Patent
Howell

(10) Patent No.: US 6,570,613 B1
(45) Date of Patent: May 27, 2003

(54) RESOLUTION-ENHANCEMENT METHOD FOR DIGITAL IMAGING

(76) Inventor: Paul Howell, 477 Congress St., Portland, ME (US) 04101

( * ) Notice: Subject to any disclaimer, the term of this patent is extended or adjusted under 35 U.S.C. 154(b) by 0 days.

(21) Appl. No.: 09/512,503

(22) Filed: Feb. 24, 2000

Related U.S. Application Data

(60) Provisional application No. 60/121,855, filed on Feb. 26, 1999.

(51) Int. Cl.[7] .............................. H04N 5/232; H04N 3/14
(52) U.S. Cl. ................................. 348/219.1; 348/218.1; 348/273
(58) Field of Search ................................ 348/218, 219, 348/448, 270, 271, 272, 273, 218.1, 219.1; 250/370.09, 363.06

(56) References Cited

U.S. PATENT DOCUMENTS

| | | | |
|---|---|---|---|
| 3,971,065 A | | 7/1976 | Bayer |
| 4,992,878 A | * | 2/1991 | Hersh ........................ 348/219 |
| 5,340,988 A | * | 8/1994 | Kingsley et al. ....... 250/370.09 |
| 5,489,994 A | | 2/1996 | Torok et al. |
| 5,561,460 A | * | 10/1996 | Katoh et al. ................. 348/219 |
| 5,712,685 A | * | 1/1998 | Dumas ....................... 348/219 |
| 5,757,005 A | * | 5/1998 | Callas et al. ........... 250/363.06 |
| 5,767,987 A | * | 6/1998 | Wolff et al. ................. 348/448 |
| 5,907,353 A | * | 5/1999 | Okauchi ..................... 348/218 |
| 6,166,384 A | * | 12/2000 | Dentinger et al. ..... 250/370.09 |
| 6,304,293 B1 | * | 10/2001 | Kubota et al. .............. 348/270 |

* cited by examiner

Primary Examiner—Wendy R. Garber
Assistant Examiner—Luong Nguyen
(74) Attorney, Agent, or Firm—Patricia M. Mathers; Thomas L. Bohan

(57) ABSTRACT

A method for resolution enhancement of a still-image made by a digital imaging device. The method allows the use of high-aperture-ratio sensing arrays that produce resolution-enhancement, independent of the angle of view. Resolution-enhancement is achieved using a multiple-exposure technique of a sub-pixel overtap in conjunction with a whole-pixel shift. The method suppresses color-aliasing in a multiple-exposure native-resolution mode and enables the use of a single camera for single-exposure and multiple-exposure modes.

14 Claims, 15 Drawing Sheets

FIG. 5
PRIOR ART: TILING THE ARRAY
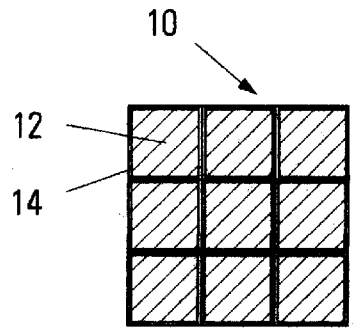
FIG. 5A
(PRIOR ART)
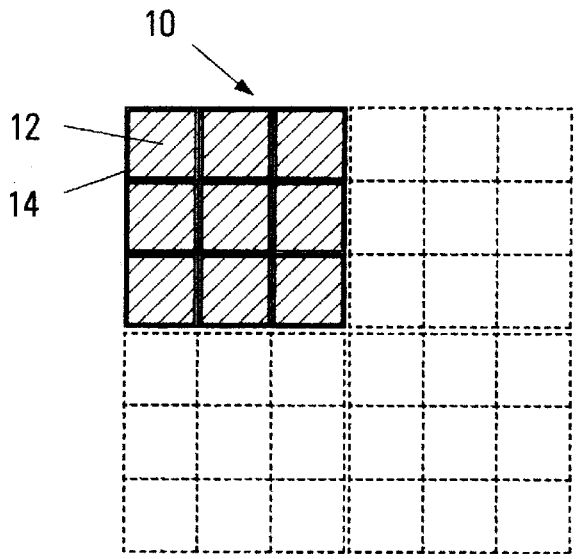
FIG. 5B
(PRIOR ART)
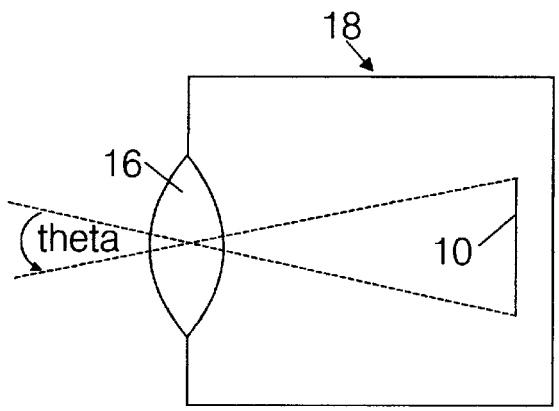
FIG. 5C
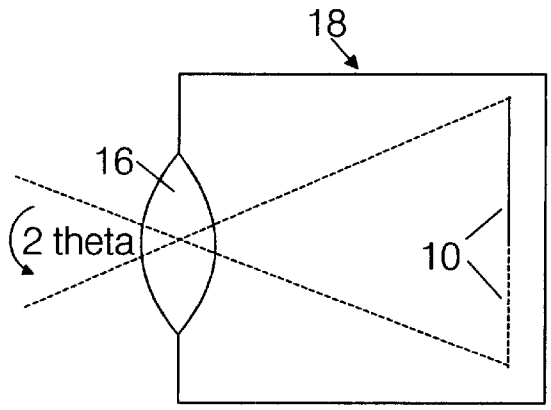
FIG. 5D

FIG. 6
PRIOR ART:
INTERSTITIAL RESOLUTION ENHANCEMNT
FIG. 6A
FIRST POSITION
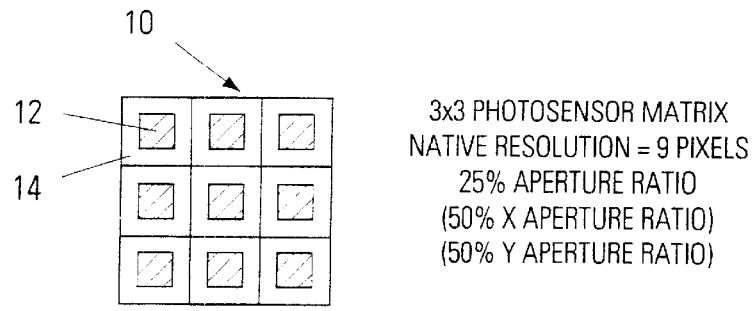
3x3 PHOTOSENSOR MATRIX
NATIVE RESOLUTION = 9 PIXELS
25% APERTURE RATIO
(50% X APERTURE RATIO)
(50% Y APERTURE RATIO)
FIG. 6B
DISPLACEMENT MAP
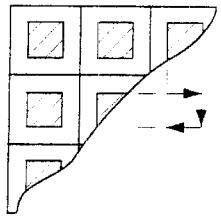
THREE DISPLACEMENTS
+X, -Y, -X
FIG. 6C
ENHANCED RESULT
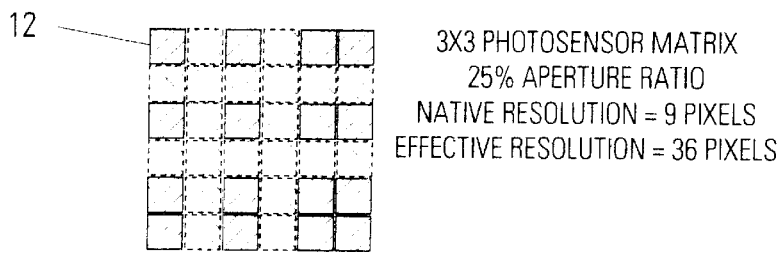
3X3 PHOTOSENSOR MATRIX
25% APERTURE RATIO
NATIVE RESOLUTION = 9 PIXELS
EFFECTIVE RESOLUTION = 36 PIXELS

FIG. 7
PRIOR ART:
ILLUSTRATION OF
COLOR ALIASING

FIG. 7A

TYPICAL ORGANIZATION OF A COLOR FILTERD ARRAY

| G | R | G | R |
|---|---|---|---|
| B | G | B | G |
| G | R | G | R |
| B | G | B | G |

FIG. 7B

ACTUAL LIGHT INTENSITIES

ACTUAL RED INTENSITY

| 10 | 50 | 10 | 10 |
|----|----|----|----|
| 10 | 50 | 10 | 10 |
| 10 | 50 | 10 | 10 |
| 10 | 50 | 10 | 10 |

ACTUAL GREEN INTENSITY

| 10 | 50 | 10 | 10 |
|----|----|----|----|
| 10 | 50 | 10 | 10 |
| 10 | 50 | 10 | 10 |
| 10 | 50 | 10 | 10 |

ACTUAL BLUE INTENSITY

| 10 | 50 | 10 | 10 |
|----|----|----|----|
| 10 | 50 | 10 | 10 |
| 10 | 50 | 10 | 10 |
| 10 | 50 | 10 | 10 |

FIG. 7C

MEASURED LIGHT INTENSITIES

MEASURED RED INTENSITY

| -  | 50 | -  | 10 |
|----|----|----|----|
| -  | -  | -  | -  |
| -  | 50 | -  | 10 |
| -  | -  | -  | -  |

MEASURED GREEN INTENSITY

| 10 | -  | 10 | -  |
|----|----|----|----|
| -  | 50 | -  | 10 |
| 10 | -  | 10 | -  |
| -  | 50 | -  | 10 |

MEASURED BLUE INTENSITY

| -  | -  | -  | -  |
|----|----|----|----|
| 10 | -  | 10 | -  |
| -  | -  | -  | -  |
| 10 | -  | 10 | -  |

FIG. 7D

INTERPOLATED LIGHT INTENSITIES

INTERPOLATED RED INTENSITY

| 30 | 50 | 30 | 10 |
|----|----|----|----|
| 30 | 50 | 30 | 10 |
| 30 | 50 | 30 | 10 |
| 30 | 50 | 30 | 10 |

INTERPOLATED GREEN INTENSITY

| 10 | 30 | 10 | 10 |
|----|----|----|----|
| 20 | 50 | 40 | 10 |
| 10 | 30 | 10 | 10 |
| 20 | 50 | 40 | 10 |

INTERPOLATED BLUE INTENSITY

| 10 | 10 | 10 | 10 |
|----|----|----|----|
| 10 | 10 | 10 | 10 |
| 10 | 10 | 10 | 10 |
| 10 | 10 | 10 | 10 |

FIG. 8    PREFERRED EMBODIMENT
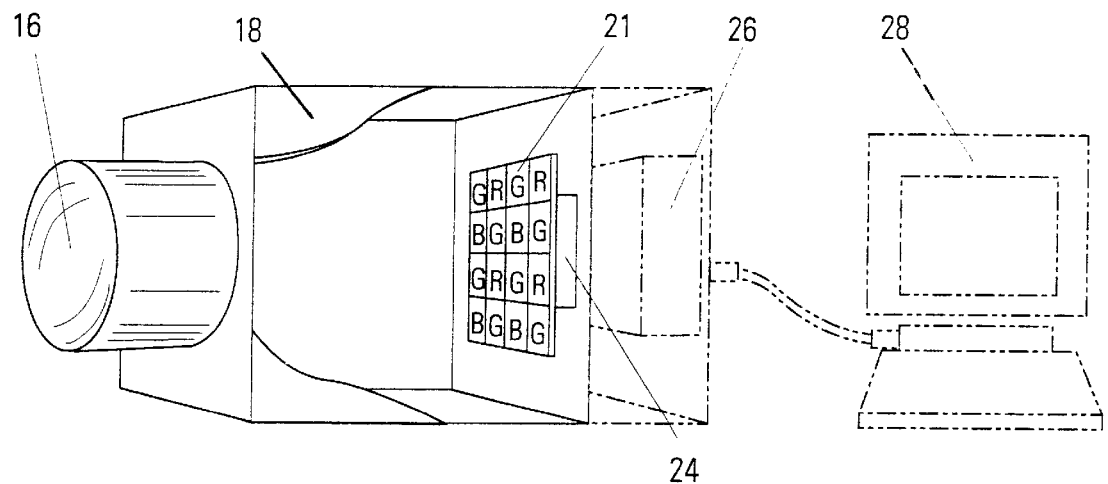
FIG. 9    ALTERNATE EMBODIMENT
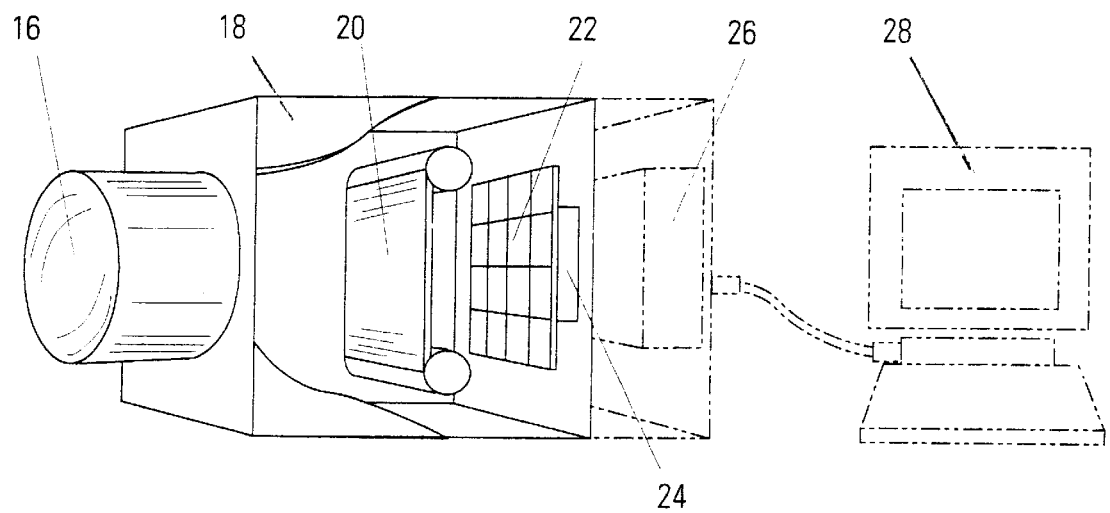

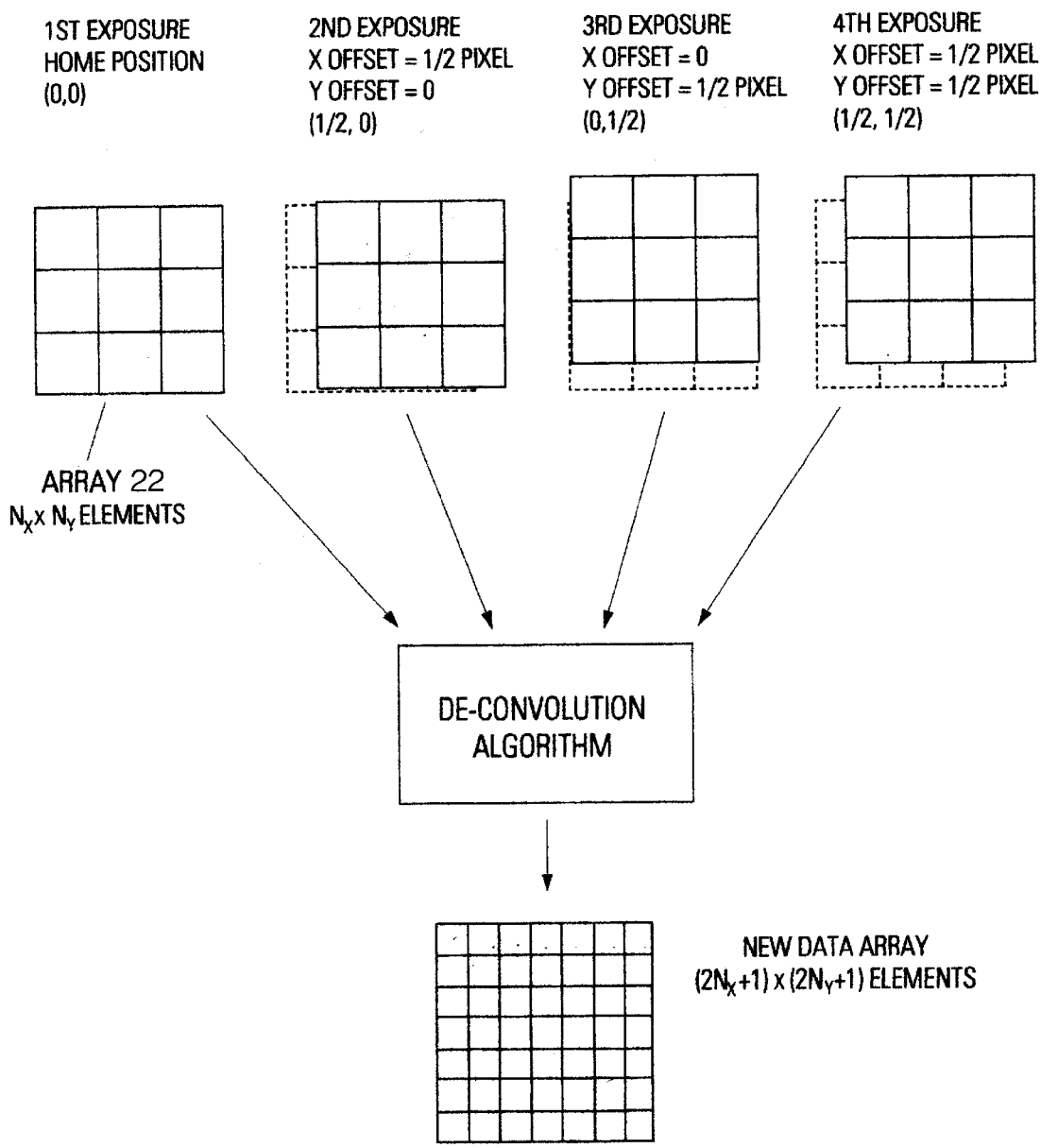

FIG. 11
OBTAINING FULL COLOR COVERAGE WITH A BAYER COLOR FILTERED ARRAY (CFA)

FIG. 11A
BAYER COLOR FILTERD ARRAY (CFA) IN HOME POSITION

| G | R | G | R |
|---|---|---|---|
| B | G | B | G |
| G | R | G | R |
| B | G | B | G |

FIG. 11B
EXPOSE/SHIFT PATTERN
1: (0,0)
2: (1,0)
3: (1,1)
4: (0,1)

FIG. 11C
RESULTING FULL COLOR COVERAGE

RED DATA

| R | R | R | R |
|---|---|---|---|
| R |   |   | R |
| R | R |   | R |
| R | R | R | R |

BLUE DATA

| B | B | B | B |
|---|---|---|---|
| B | B | B | B |
|   |   | B | B |
| B |   | B | B |

GREEN DATA

| GG | GG | GG | GG |
|----|----|----|----|
|    |    | GG | GG |
| GG |    | GG | GG |
| GG | GG | GG | GG |

R = HOME POS. DATA
r = SHIFTED DATA

B = HOME POS. DATA
b = SHIFTED DATA

G = HOME POS. DATA
g = SHIFTED DATA

FIG. 12
OBTAINING FULL COLOR COVERAGE WITH A STRIPED PATTERN AND TWO EXPOSURES

FIG. 12A
STRIPED COLOR FILTERD ARRAY (CFA) IN HOME POSITION

| R | G | B | R |
|---|---|---|---|
| R | G | B | R |
| R | G | B | R |
| R | G | B | R |

FIG. 12B
EXPOSE/SHIFT PATTERN
1: (0,0)
2: (1,0)
3: (2,0)

FIG. 12C
RESULTING FULL COLOR COVERAGE

RED DATA

| R | R | R | R |
|---|---|---|---|
| R | R | R | R |
| R | → | → | R |
| R | R | R | R |

BLUE DATA

| B | B | B | B |
|---|---|---|---|
| B | B | B | B |
| B | B | B | B |
| → | → | B | → |

GREEN DATA

| G | G | G | G |
|---|---|---|---|
| G | G | G | G |
| G | G | → | → |
| G | G | G | G |

R = HOME POS. DATA
r = SHIFTED DATA

B = HOME POS. DATA
b = SHIFTED DATA

G = HOME POS. DATA
g = SHIFTED DATA

FIG. 13
OBTAINING FULL COLOR COVERAGE WITH THE BAYER PATTERN AND TWO EXPOSURES

FIG. 13A
BAYER
COLOR FILTERD
ARRAY (CFA)
IN HOME POSITION

| G | R | G | R |
|---|---|---|---|
| B | G | B | G |
| G | R | G | R |
| B | G | B | G |

FIG. 13B
EXPOSE/SHIFT PATTERN
1: (0,0)
2: (1,0)

FIG. 13C
RESULTING FULL COLOR COVERAGE

RED DATA

| R | R | *R* | R |
|---|---|---|---|
| *R* | R | *R* | R |
| R | R→ | *R* | R |
| *R* | R | *R* | R |

BLUE DATA

| *B* | *B* | *B* | *B* |
|---|---|---|---|
| B | *B* | B | *B* |
| *B* | *B* | *B* | *B* |
| B→ | *B* | B | *B* |

GREEN DATA

| G | *G* | G | *G* |
|---|---|---|---|
| *G* | G | *G* | G |
| G→ | *G* | G | *G* |
| *G* | G | *G* | G |

R = HOME POS. DATA
R = SHIFTED DATA
*R* = INTERPOLATED DATA

B = HOME POS. DATA
B = SHIFTED DATA
*B* = INTERPOLATED DATA

G = HOME POS. DATA
*G* = SHIFTED DATA
NO INTERPOLATED DATA

FIG. 14
PREFERRED DE-CONVOLUTION ALGORITHM
RESOLUTION QUADRUPLING EXAMPLE

SPATIAL RELATIONSHIP
OF THE FULLY PACKED
SINGLE COLOR DATA SETS
RESOLUTION QUADRUPLING EXAMPLE

FULLY PACKED
COLOR DATA SET
X OFFSET = 0
Y OFFSET = 0 PIXEL

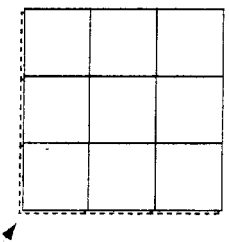

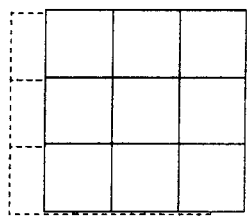

FULLY PACKED
COLOR DATA SET
X OFFSET = 1/2 PIXEL
Y OFFSET = 0 PIXEL

HOME
POSITION
(0,0)

FULLY PACKED
COLOR DATA SET
X OFFSET = 0 PIXEL
Y OFFSET = 1/2 PIXEL

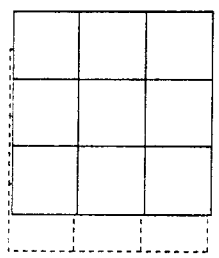

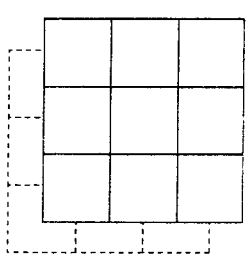

FULLY PACKED
COLOR DATA SET
X OFFSET = 1/2 PIXEL
Y OFFSET = 1/2 PIXEL

HOME
POSITION
(0,0)

PREFERRED DE-CONVOLUTION ALGORITHM
RESOLUTION QUADRUPLING EXAMPLE

PREFERRED DE-CONVOLUTION PROCEDURE
RESOLUTION QUADRUPLING EXAMPLE

PREFERRED DE-CONVOLUTION PROCEDURE
RESOLUTION QUADRUPLING EXAMPLE

FIG. 18
PREFERRED ONE-DIMENSIONAL DE-CONVOLUTION ALGORITHM
(UNSCALED DATA)

FIG. 18A SECOND ORDER

Increasing One-ended $$R_n = \begin{cases} \frac{P_n}{2} + f\left(P_{n-1} - R_{n-1} - \frac{P_n}{2}\right) & 0 < R_n < S \\ 0 & R_n < 0 \\ S & R_n > S \end{cases}$$

Decreasing One-ended $$R_n = \begin{cases} \frac{P_{n-1}}{2} + f\left(P_n - R_{n+1} - \frac{P_{n-1}}{2}\right) & 0 < R_n < S \\ 0 & R_n < 0 \\ S & R_n > S \end{cases}$$

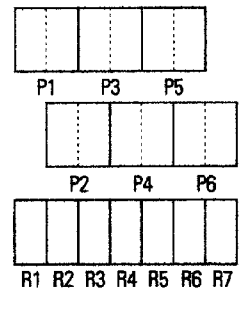

FIG. 18B THIRD ORDER

Increasing One-ended $$R_n = \begin{cases} \frac{P_n}{3} + f\left(P_{n-2} - R_{n-1} - R_{n-2} - \frac{P_n}{3}\right) & 0 < R_n < S \\ 0 & R_n < 0 \\ S & R_n > S \end{cases}$$

Decreasing One-ended $$R_n = \begin{cases} \frac{P_{n-2}}{3} + f\left(P_n - R_{n+1} - R_{n+2} - \frac{P_{n-2}}{3}\right) & 0 < R_n < S \\ 0 & R_n < 0 \\ S & R_n > S \end{cases}$$

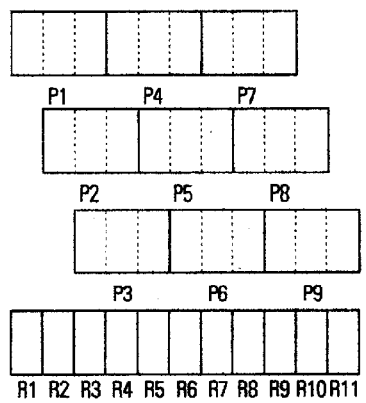

FIG. 18C GENERAL RESULT

Increasing One-ended $$R_n = \begin{cases} \frac{P_n}{k} + f\left(P_{n-(k-1)} - \frac{P_n}{k} - \sum_{i=1}^{i=k-1} R_{n-i}\right) & 0 < R_n < S \\ 0 & R_n < 0 \\ S & R_n > S \end{cases}$$

Decreasing One-ended $$R_n = \begin{cases} \frac{P_{n-(k-1)}}{k} + f\left(P_n - \frac{P_{n-(k-1)}}{k} - \sum_{i=1}^{i=k-1} R_{n+i}\right) & 0 < R_n < S \\ 0 & R_n < 0 \\ S & R_n > S \end{cases}$$

Where:
$P_n$ = input pixel
$R_n$ = result pixel
$k$ = order of resolution enhancement
$f$ = convergence factor
$S$ = upper data limit

FIG. 19
PREFERRED ONE-DIMENSIONAL
DE-CONVOLUTION ALGORITHM
(DATA PRE-SCALED IN CAMERA)

FIG. 19A SECOND ORDER

Increasing One-ended $$R_n = \begin{cases} P_n + f\left(2P_{n-1} - R_{n-1} - P_n\right) & 0 < R_n < S \\ 0 & R_n < 0 \\ S & R_n > S \end{cases}$$

Decreasing One-ended $$R_n = \begin{cases} P_{n-1} + f\left(2P_n - R_{n+1} - P_{n-1}\right) & 0 < R_n < S \\ 0 & R_n < 0 \\ S & R_n > S \end{cases}$$

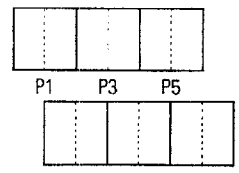

FIG. 19B THIRD ORDER

Increasing One-ended $$R_n = \begin{cases} P_n + f\left(3P_{n-2} - R_{n-1} - R_{n-2} - P_n\right) & 0 < R_n < S \\ 0 & R_n < 0 \\ S & R_n > S \end{cases}$$

Decreasing One-ended $$R_n = \begin{cases} P_{n-2} + f\left(3P_n - R_{n+1} - R_{n+2} - P_{n-2}\right) & 0 < R_n < S \\ 0 & R_n < 0 \\ S & R_n > S \end{cases}$$

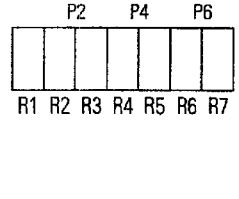

FIG. 19C GENERAL RESULT

Increasing One-ended $$R_n = \begin{cases} P_n + f\left(kP_{n-(k-1)} - P_n - \sum_{i=1}^{i=k-1} R_{n-i}\right) & 0 < R_n < S \\ 0 & R_n < 0 \\ S & R_n > S \end{cases}$$

Decreasing One-ended $$R_n = \begin{cases} P_{n-(k-1)} + f\left(kP_n - P_{n-(k-1)} - \sum_{i=1}^{i=k-1} R_{n+i}\right) & 0 < R_n < S \\ 0 & R_n < 0 \\ S & R_n > S \end{cases}$$

Where:

$P_n$ = input pixel
$R_n$ = result pixel
$k$ = order of resolution enhancement
$f$ = convergence factor
$S$ = upper data limit

RESOLUTION-ENHANCEMENT METHOD FOR DIGITAL IMAGING

This application claims the benefit of provisional application No. 60/121,855, filed Feb. 26, 1999.

BACKGROUND OF THE INVENTION

1. Field of the Invention

The present invention relates to devices and methods to increase the effective resolution of an array of spaced-apart light-sensitive transducers used to record an image in a digital imaging device.

2. Description of the Prior Art

Devices that record a visual scene by using an array of photoelectric sensors are well known in the art. Such a device configured as a scanner may be used to record digitally an existing transparency or print, or, in the form of a camera, may record a scene. The photoelectric-sensor array is typically a charge-coupled device (CCD) that outputs analog information that, in turn, is commonly digitized through the use of an analog-to-digital converter (ADC) and stored as bits of data in computer memory or other form of electronic storage. For this discussion we will refer to camera-type devices utilizing CCD array sensors, though the principles laid out here apply equally well to cameras constructed with other types of photoelectric sensors.

Often the CCD is the single most expensive part of the digital camera. The quality of the recorded image is related in part to the total number of sensing elements (pixels) that are present in the CCD. The greater this number, the higher the quality of the resulting image. In fact, it is the number of pixels that the camera can capture that will often distinguish one camera from another in the marketplace. Thus any device or method that can increase the effective pixel count of a CCD without causing the actual count to increase is of interest to camera manufacturers since such a device can achieve higher performance with minimal cost increase.

Professional digital cameras used in the studio tend to fall into two categories: (1) those that can record action scenes, but sacrifice color accuracy and suffer from color aliasing; (2) those that can only record still-life scenes, but have higher accuracy and resolution enhancement. Since most studios must photograph both types of scenes, most studios are compelled to own both types of cameras at a considerable financial burden. A single camera that can function in both modes would be very desirable.

Definition of Terms

An "array sensor" is a sensor containing an array of tiled sensor pixels, i.e., the sensor pixels are arranged in contiguous horizontal rows and vertical rows. A "sensor pixel" is defined as the smallest unit of area on the sensor that can be tiled to create an array. By this definition, a sensor pixel may include both light-sensitive and non-light-sensitive regions. Referring to FIG. 1, array 10 is comprised of many instances of pixel 11, pixel 11 being further comprised of light-sensitive region 12 and non-light-sensitive region 14. "Sensor pixel pitch" in either the X or Y direction is equal to the dimension of sensor pixel 10 in the corresponding direction. (Alternatively, it can be described as the center-to-center distance between pixels in the stated direction.) "Aperture ratio" is defined as the area of light-sensitive region 12 divided by the total pixel area (the sum of the area of non-light-sensitive region 14 and light-sensitive region 12). Aperture ratio can be decomposed into an X component and a Y component. FIG. 1 represents an array with an aperture ratio of about 25% (50% in X and 50% in Y). FIG. 2 represents an array with an aperture ratio of about 50% (50% in X and about 100% in Y). FIG. 3 represents an array with a nearly 100% aperture ratio. The term "resolution" refers to a total number of pixels being fixed. Resolution is a measure of information. "Native resolution" refers to the actual number of pixels in the imager. "Effective resolution" produced from some resolution-enhancement technique is defined to be numerically equal to the native resolution that would be otherwise needed to create the same amount and quality of pixel information without said technique.

The terms "image pixel" and "sensor pixel" distinguish the image realm from the sensor realm. An image is typically comprised of image pixels that are computed from sensor pixel data using a correspondence that is often, but not necessarily one-to-one.

Many devices and methods have been proposed to make the effective sensor resolution higher than the native sensor resolution. In general, these approaches can be divided into three main categories.

Three Approaches to Increase Sensor Resolution.

The most straightforward approach is the tiling approach, which is to move, between successive exposures, the entire sensing array once or multiple times a distance equal to the width and/or height of the whole array and tiling the resulting image pixels together. The effective sensor resolution is higher than the native resolution by the number of such moves that occur in the course of producing the net image of such tiles.

The tiling approach has several disadvantages. First, it is difficult to implement, since the translation device must rapidly and with sub-pixel pitch accuracy displace the array a distance equal to its full width and/or height with repeatable results. Since the typical imager will have thousands of pixels in each dimension, the positioning accuracy must be, say, one part in ten thousand or better to get good tiling. Also, the imaging array must not be displaced in a direction normal to the focal plane or a deleterious focus shift will occur. Finally, such an approach has the effect of making the angle of view dependent on the size of the tiling for a given focal length lens. This is a very awkward situation since a non-tiled image does not yield a preview of a final higher resolution image but rather only a section of the higher resolution image. Thus the whole tiling procedure must be completed before viewing a high resolution image is possible. If the photographer completes his or her image at a low resolution (say a single tile for example) and is satisfied with the aesthetics, but decides the image lacks sufficient resolution, then the new exposure must be tiled demanding that the photographer change lenses and recompose. This change of lens is slow, and usually requires re-focusing and resetting the aperture. A zoom lens can be used to overcome the lens substitution problem, but not the re-composition problem, and zoom lenses usually possess a lower resolving power than the same fixed focal length lens. FIGS. 5A and 5B illustrate the tiling approach. FIG. 5A shows a 3×3 array with a native resolution f9 and angle of view theta; FIG. 5B shows the 3×3 array tiled 3 times, with a native resolution of 9 and an enhanced resolution of 27. The angle of view is (2)×theta.

It would be much more desirable to maintain the same angle of view independent of effective resolution. This would allow a quick preview for aesthetic composition for example.

The second approach is the interstitial approach. This approach depends on the fact that the aperture ratio of some imagers is or can be made to be equal to or less than 50% in at least one (X or Y) direction, i.e., part of each pixel is non-sensitive. For example, an interline transfer CCD has columns of non-sensitive regions interleaved with the sensitive regions. Such imagers are common in video cameras. A way to increase the effective sensor resolution with such imagers is to shift light-sensitive regions into the non-sensitive regions. By shifting such a "sparse" CCD array by an amount sufficient to re-position the light sensitive areas to a new position previously occupied entirely by non-sensitive areas, a new array of image data is produced that interleaves with the native data, thus increasing the effective sensor pixel count. The success of this approach depends in part on the fact that the native and shifted data sets are not convoluted because there is no spatial overlap between the unshifted and shifted light-sensitive positions.

Many such shifting methods exist and all depend on the existence of insensitive regions of the array into which the sensitive areas may be shifted. Torok et al. (U.S. Pat. No. 5,489,994; 1996) teaches a modification of an existing CCD design by adding said insensitive regions that otherwise would not exist, thereby enabling the CCD to be used in such an interstitial resolution-enhancement mode. FIG. 6 illustrates the use of the interstitial resolution-enhancement technique. In FIG. 6A 3×3 array is shown that has a 25% aperture ratio. Referring to FIG. 6B, four exposures are taken, a first exposure, then a second where the array is displaced in the X direction by the width of the light-sensitive region 12, then a third after a displacement in the negative Y direction and finally a fourth after a negative X displacement. The resulting 36 member virtual array is illustrated in FIG.

While the interstitial shifting technique does increase the effective resolution of the array it suffers from several drawbacks. First, the most faithful reproduction of an image projected onto an array of sensing elements is achieved when the aperture ratio nears 100%. As the aperture ratio decreases below 100%, pixel sampling error becomes more and more pronounced. Thus if one intends to have a low resolution mode as well as a high resolution mode employing interstitial shifting, the quality of the low resolution mode will be compromised by sampling error. Another drawback of the low aperture ratio interstitial shifting method is compromised pixel sensitivity. The light sensitivity of a given pixel in a CCD as measured by the number of electrons produced per unit of illumination is linearly related to the size of the light-sensitive area of the pixel all other factors held constant. Since a more sensitive pixel is a general design goal by virtue of improved signal-to-noise performance and because a more sensitive imager is generally desirable for well known reasons, CCD's with small aperture ratios are not as desirable for still photography as those with aperture ratios approaching 100%. A further drawback of the low-aperture-ratio interstitial-shifting method is that the degree of resolution-enhancement that can be achieved depends on the aperture ratio. For example, if the aperture ratio is 50% laterally and 100% vertically, then only a resolution doubling can be achieved laterally, and no enhancement is possible vertically. As another example, if the artificial apertures as taught by Torok et al. are contrived to create a 50% aperture ratio both laterally and vertically (25% total aperture ratio) as illustrated in FIG. 6, then a resolution doubling both laterally and vertically is possible, but not say, tripling or quadrupling.

The third approach is the overlapped shifting approach, which achieves higher resolution by shifting the sensing array and allowing overlap of the pixels. While there is much in the prior art describing approaches that shift arrays using the interstitial method, there is very little describing the overlapped shifting, or sub-pixel-shifting, approach. Hersh (U.S. Pat. No. 4,992,878; 1991) teaches how to increase the effective pixel count by moving a color-filtered array a distance less than a "pixel" width between exposures of an invariant scene and extracting the resulting higher resolution information. However, the Hersh invention considers a 'pixel' as comprising a cluster of four neighboring but distinct color-filtered sensing elements: clear, yellow filtered, cyan filtered, and green filtered. By considering a pixel to be a composite of four sensing elements, several serious disadvantages are introduced. First, the native resolution becomes one-fourth what it would be if the individual sensing elements were considered to be independent pixels, thus partially defeating the very purpose of the invention.

Also, the cited prior art fails to address the problem of color aliasing. Color aliasing problems potentially exist for all camera configurations that use local color filtering of the sensing matrix unless specific anti-aliasing techniques are employed. Color aliasing exists when using a color-filtered array (CFA) because at any given pixel, two out of the three primary colors (in, for example, an R-G-B- system) have not been sampled. The missing data must be interpolated from neighboring pixels, and the interpolation can only approximate the true data. Color aliasing is most troublesome when the spatial frequency of the image formed on the CCD (or other his type of imager) meets or exceeds the Nyquist frequency of the imager (½ the sampling spatial frequency). Furthermore, color aliasing reduces the usable resolution of a CFA below what would be expected from the size of the array. For example, a monochrome array capturing a monochrome image will faithfully record higher spatial frequency data than will the same sized CFA recording the same monochrome image.

FIG. 7 illustrates the color aliasing phenomenon. FIG. 7A shows a typical CFA in the Bayer pattern: 50% green imaging sites, 25% blue and 25% red. A monochrome image is projected onto the CFA in the pattern shown in FIG. 7B. As can be visualized, the pattern is a simple bright gray column (intensity=50) in a field of dark gray (intensity=10). Monochrome is defined here to mean equal parts of red, green, and blue light components. It is clear from FIG. 7C that only a fraction of the actual color component intensities are measured by the CFA. The CFA has trouble with this image since the spatial frequency of the image is higher than the Nyquist frequency of the CFA. A simple nearest neighbor interpolation to recover the missing data is illustrated in FIG. 7D. As can been seen in FIG. 7D, there is significant false color generation on either side of the bright column, and the spatial fidelity is reduced as well. Of course other interpolation schemes are possible, but no interpolation scheme can overcome the fact that the CFA records only a fraction of all the information needed to faithfully record a color image at a spatial frequency approaching the Nyquist frequency of the CFA. The problem can be described in terms of information theory. The total information needed to record a color image that fills an arbitrary n*m array is five dimensions of data: the two spatial dimensions (X and Y) and the three color dimensions (red, green, and blue in the case of the RGB system). Thus for the arbitrary n*m array, a data set totaling n*m*3 pieces of data must be assembled to faithfully record a color image at the Nyquist frequency. Clearly the CFA records just 60% of the needed data space, and a tradeoff must be made between color fidelity and spatial fidelity. Each piece of data typically contains 8 to 14 bits of data, the bit depth being determined by the bit resolution of the ADC. Higher bit depths allow more faithful tonal reproduction, lower bit depths in the extreme can lead to overly quantized tonal reproduction ("posterization").

Color aliasing can be attacked by holding the spatial frequency of the image below the Nyquist frequency of the imager (by using a form of blurring filter, for example), but the tradeoff expressed above forces a resolution loss. Resolution-enhancement loses value now since there is little additional image information available anyway. If no blurring filter is used, then the problem of color aliasing deflates the resolution-enhancement achieved and one is left with the problem of false color.

What is needed is a resolution-enhancement method that allows the use of high-aperture-ratio sensing arrays, that enables resolution-enhancement, independent of the angle of view, and that provides multiples of higher resolution in a plurality of resolution-enhancement modes that are variable in horizontal and vertical axes. What is further needed is such a method that suppresses color aliasing without requiring macro movement of the sensing array. What is yet further needed is such a method that enables use of a single camera for both single-exposure and multiple-exposure work.

BRIEF SUMMARY OF THE INVENTION

It is an object of the present invention to provide a color still-image pickup method that allows the use of high-aperture-ratio sensing arrays that enables resolution-enhancement, independent of the angle of view. It is a further object of the present invention to provide such a method that provides multiples of higher resolution in a plurality of resolution-enhancement modes that are variable in the horizontal and vertical axes. It is a yet further object of the present invention to provide such a method that suppresses color-aliasing in a multi-exposure native-resolution mode. It is a still further object of the present invention to provide such a method that enables use of a single camera for work in both single-exposure and multiple-exposure modes.

The objectives are achieved by providing a resolution-enhancement method of taking still-image exposures in a multiple-exposure technique, using a sub-pixel overlap in conjunction with a whole-pixel shift In the Preferred Embodiment, only two exposures per degree of resolution-enhancement are required, as compared to, say, the three exposures required by a global filtered tiling method. Because the Preferred Embodiment uses a CFA sensing device (CCD), a single exposure at native resolution is sufficient to provide a full color image to the same scale as any subsequent enhanced resolution without requiring any change of lens.

In an alternate embodiment, an unfiltered (monochrome) CCD is used in conjunction with global color filtering to suppress color aliasing. In the alternate embodiment all of the advantages of the Preferred Embodiment are preserved, except that three exposures are required at native resolution to form a color preview.

BRIEF DESCRIPTION OF THE DRAWINGS

FIGS. 5A and 5C are an illustration of a known tiling approach showing a 3×3 array and a native resolution of 9 (prior art).

FIGS. 5B and 5D are an illustration of a known tiling approach showing a 3×3 array with a native resolution of 9 and an enhanced resolution of 27 (prior art).

FIG. 6 illustrates the interstitial approach to resolution-enhancement.

FIG. 7 illustrates the problem of color aliasing in a Bayer-patterned imager.

FIG. 8 is a front perspective view of the Preferred Embodiment of the present invention.

FIG. 9 is a front perspective view of an alternate embodiment of the present invention.

FIG. 10 illustrates resolution-quadrupling for a single color in the alternate embodiment.

FIG. 11 illustrates one way to achieve full color coverage with the Bayer array using four exposures.

FIG. 12 illustrates one way to achieve 100% color coverage with a striped pattern array using three exposures.

FIG. 13 illustrates obtaining full color coverage with the Bayer pattern by using only two exposures.

FIG. 14 illustrates the spatial relationship of the color data arrays in the Preferred Embodiment for the case of resolution-quadrupling.

FIG. 18 describes a generalized, a second-order, and a third-order de-convolution expression for calculating the electron response.

FIG. 19 describes the preferred generalized and second-order and third-order de-convolution expressions for calculating the illumination response.

DETAILED DESCRIPTION OF THE INVENTION

Figure 1:
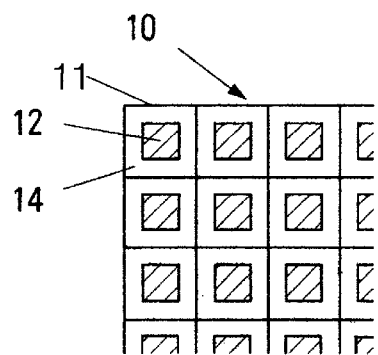
FIG. 1 is a plan view of a prior art array of light-sensitive pixels such as a CCD, showing the light-sensitive regions and the non-sensitive regions.
Figure 2:
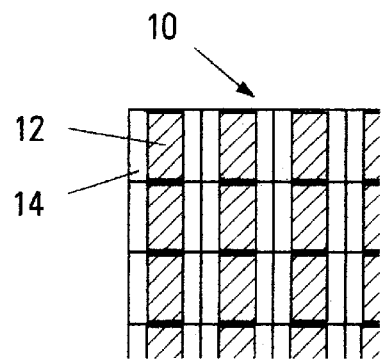
FIG. 2 is a plan view of a prior art interline transfer type of CCD with a 50% horizontal aperture ratio, and an essentially 100% vertical aperture ratio.
Figure 3:
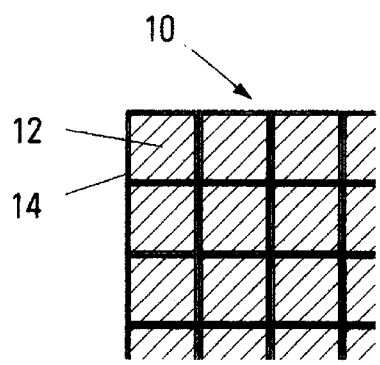
FIG. 3 is a plan view of a prior art frame transfer type of CCD illustrating a 100% aperture ratio sensor.
Figure 4:
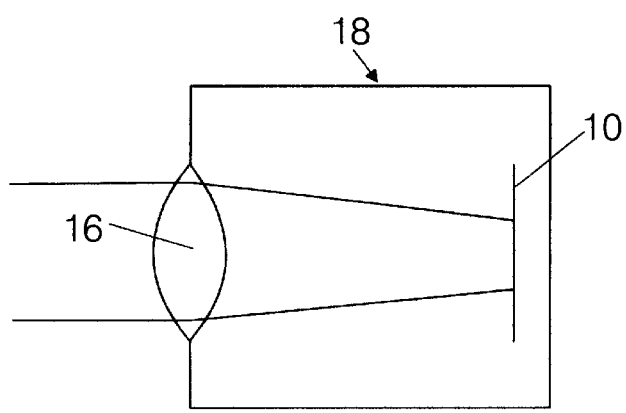
FIG. 4 is a cross-sectional view of a basic camera configuration.

Note: Throughout the discussion hereinafter, reference is made to a digital camera for purposes of illustration. It should be understood, however, that the method of the present invention may be just as well applied to any number of digital imaging devices, such as, for example, a digital scanner.

The Preferred Embodiment of the present invention is best understood in reference to FIG. 8. An array 21 of color-filtered light-sensitive devices is mounted on an X-Y micropositioning stage 24 that is itself mounted inside a light-tight enclosure 18. At the front of enclosure 18 is an image-forming lens 16. The image-forming lens 16 may be equipped with an internal shutter, or the shutter operation may be outside the lens. It can be appreciated that this familiar camera configuration can take many, many forms and still function substantially as laid out in FIG. 8. Such configurations include the reflex configuration, the twin lens reflex configuration, or the view camera configuration, among others. The array 21 is filtered at the pixel level, and, in the Preferred Embodiment, the colors are red, green, and blue in the pattern shown in FIG. 7A and in FIG. 8. Other patterns are possible including reflections and rotations of the illustrated pattern that are equally applicable. Other colors are possible, too, depending on the spectral regions of interest. In the Preferred Embodiment, the spectral region of interest is the visible spectrum. Array 21 is a frame transfer CCD that has a large aperture ratio. Examples of such arrays are the Kodak KAF series such as the KAF-4201, the KAF-6301, and the KAF-16800. The array 21 rests on a piezoelectric driven X-Y translation flexure stage. Piezoelectric actuators are well known in the art and offer great variety in positioning accuracy and range. Actuators are available that provide the micron-level positioning accuracy and a range of fifty or so microns, as is desired in the Preferred Embodiment. Queensgate Instruments manufactures a broad range of Applicant's piezoelectric positioning devices, and flexure stages can be fabricated easily, or obtained from Melles-Griot Inc., for example. For more precise positioning control, closed-loop capacitive feedback is recommended in the Preferred Embodiment.

With continuing reference to FIG. 8, note that analog signals are read out from the CCD array 21 and digitized by a CCD controller and analog-to-digital converter (ADC) assembly 26 in a manner that is well known in the art. The data thus captured may be stored locally or transmitted to computer 28 to be stored and prepared for image reconstruction computations.

In an alternate embodiment of the present invention, illustrated in FIG. 9, a CCD array 22 is unfiltered. Another difference from the Preferred Embodiment is that a global filtering device 20 is used to filter all of the light from lens 16 falling on array 22. It will be appreciated that since the object of filter 20 is to filter all the image light reaching array 22, it makes no functional difference if filter 20 is positioned inside box 18 as shown in FIG. 9, or externally, for example, immediately in front of lens 16. In the alternate embodiment, filter 20 is capable of filtering for red, green, and blue light separately; other combinations, however, are possible that would not affect an object of the invention to increase resolution without color aliasing.

The operation of the alternate embodiment of the invention will first be described, since it is conceptually simpler than that of the Preferred Embodiment. However, many of the principles of operation are shared by the two embodiments. The example of resolution-quadrupling will be taken first, with generalization to other orders of resolution-enhancement to follow.

Description of the Alternate Embodiment Array Movements and Modes

A description of array movements and modes according to the alternate embodiment is shown in FIG. 10. Starting at a home position, a first exposure is taken with the global filter 20 arbitrarily set to red, the order of color being filtered having no bearing on the final outcome. The unfiltered large-aperture-ratio array 22 records the red-filtered scene, and the data is stored according to methods common in the art. Next, array 22 is displaced from the home position a distance laterally (the X direction) equal to one-half the pixel pitch of array 22. Array 22 again records the red-filtered scene and the data is again stored. Next, the array is moved from the home position (0,0) to a position displaced one-half pixel in the Y direction (0,½), the array 22 is again exposed and the data stored. Finally, the array is displaced by one-half pixel in both the X and Y direction (½, ½), again exposed, and the data recorded. The four sets of data produced contain sufficient information to extract resolution-quadrupled information using a de-convolution expression. The preferred de-convolution expression actually yields an array of size $$(2N_x+1) \times (2N_y+1)$$

where the native resolution of the imager is ($N_x \times N_y$). The de-convolution expression will be discussed in a following section. Next, the array 22 is returned to the home position and global filter 20 is set to say, green, and the preceding procedure is repeated producing four sets of green filtered data that may be reduced by a de-convolution expression to yield the green resolution-quadrupled data. Lastly, the global filter 20 is set to the remaining color, in this case blue, and four sets of data are recorded and de-convoluted as before. There now exist three color data sets that have been resolution- quadrupled.

It is also possible to make the displacement increment, say, one-third of a pixel pitch, in each direction. Now, nine exposures for each color would be completed, covering the following displacements: (0, 0); (0, ⅓); (0, ⅔); (⅓, 0); (⅓, ⅓); (⅓, ⅔); (⅔, 0); (⅔, ⅓); and (⅔, ⅔) to yield a virtual sensor that has 9 times more pixels than the native sensor. Other possibilities are to increment by one-fourth of a pixel pitch in each direction (16×resolution), for example, or by one-half pixel in one direction and one-third pixel in another (6×resolution), and so on. In fact, we can generalize the approach to include any amount of integral resolution-enhancement in either the X- or the Y-direction by stepping the array in corresponding integral fractions of pixel pitch yielding a resolution-enhanced virtual array of size:

$$\text{Array size} = (S_x N_x + 1) \times (S_y N_y + 1)$$

where $S_x$=the X-resolution-enhancement index. and $S_y$=the Y-resolution-enhancement index. and the X-step offset $D_x$ and the Y-step offset $D_y$ are:

$$D_x = P_x / S_x$$

$$D_y = P_y / S_y$$

Where $P_x$=the X-pixel pitch
and $P_y$=the Y-pixel pitch

The methods laid out here achieve our goal of arbitrary, axis-independent resolution-enhancement with no color aliasing, with no change of angle of view, and with the extent of movement of the array approaching, at most, one pixel pitch in each direction. The color aliasing problem is eliminated since resolution-enhancement is carried out in color-isolated arrays, rather than multi-colored arrays. Thus, there is no color data to interpolate, since it has all been directly recorded at each site and individually de-convoluted.

It will be appreciated that there are many permutations of color exposure, shift order, and shift direction that yield the same final result, and by illustrating the foregoing specific directions and order of execution, we do not wish to limit the scope of the invention.

Description of the Preferred Embodiment Array Movements and Modes

A description of the array movements and modes according to the Preferred Embodiment is shown in FIG. 8. The Preferred Embodiment uses a color-filtered-array (CFA) CCD. Such a configuration requires no global filter 20 and is capable of capturing in a single exposure a full color image, albeit one that will suffer from some degree of color aliasing as previously discussed. Color aliasing and Nyquist resolution degradation are avoided in the alternate embodiment by isolating and fully filling the color spaces before resolution-enhancement is employed. In the Preferred Embodiment such color isolation and complete data packing must also be achieved, otherwise, as has been discussed in the background section, resolution-enhancement will be hindered. The goal then is to effectively isolate and fully pack the color data of the CFA before tackling resolution-enhancement.

A device and a method for obtaining isolated and fully-packed color data as described in a pending application of the inventor of the present invention—application Ser. No. 08/899,550, filed on Jul. 24, 1997, entitled "Digital Photography Device and Method," incorporated herein by reference—is the method used in the Preferred Embodiment of the present application for obtaining isolated, fully-packed color data. The method described in application Ser. No. 08/899,550 uses a CFA patterned in the well-known Bayer pattern. The advantages of using a Bayer-pattern CFA are explained in detail in the prior application. FIG. 11A shows such a CFA. If the array is exposed and moved four times, red, green, and blue color data are recorded in 100% of the sensor pixels, i.e., the data are fully packed. In FIG. 11B, the Bayer-patterned CFA has been shifted and exposed in the following sequence: (0,0); (1,0); (1,1); (0,1). FIG. 11C illustrates that 100% of the red and blue data have been recorded and that the green data have actually been doubly recorded. Conceptually, these data are identical to the data that would be produced from three global color-filtered exposures in the home position of the alternate embodiment already described. These data are completely free of color aliasing. The procedure of shifting a CFA in whole pixel increments to produce isolated, fully packed color data will now be referred to as an "orbit".

Of course, the method according to the invention encompasses the use of other CFA patterns and orbits that result in fully-packed color coverage. FIG. 12 shows an example of such a pattern. The Bayer pattern is preferred since, in the single-exposure/preview mode, it provides higher green data coverage than red or blue, corresponding to the tendency of human vision to discern finer luminance detail than color detail. Refer to Bayer (U.S. Pat. No. 3,971,065; 1976) for additional information. This is important since a feature of the Preferred Embodiment is the capability to function not only in multiple-exposure resolution-enhanced modes and a multiple-exposure native resolution mode, but also in a single-exposure color mode.

Now to implement resolution-enhancement, the CFA is first orbited from a home position, after which full red, green and blue data sets in the home position are produced as already described. Next, the CFA is shifted by a fraction of a pixel according to the degree of resolution-enhancement desired, and another orbit completed producing another set of red, green and blue data in the shifted position. The sequence of shift and orbit is repeated until all the sub-pixel shifts needed to achieve the desired resolution-enhancement are completed. At this point, the same data exist as would exist in the alternate embodiment for the same degree of resolution-enhancement and, therefore, the same de-convolution expressions may be applied to realize the resolution-enhancement sought.

Take the resolution-quadrupling example again. An orbit would be first completed in the home position, then the array displaced to (0, ½) and another orbit completed, then the array displaced to (½, 0) and an orbit completed and finally the array is displaced to (½, ½) and the last orbit is completed. Now, four sets of red data exist as previously described in the alternate embodiment and illustrated in FIG. 10. These four sets of red data are subsequently de-convoluted to produce a resolution-quadrupled array of red data. Similarly, green and blue data sets exist that are subsequently de-convoluted to produce corresponding resolution-quadrupled arrays. It is clear that, as outlined in the alternate embodiment, any order (within practical limits) of resolution-enhancement is independently obtainable in either axis without the problems of color aliasing, angle of view dependence, and without having to shift the array more than a distance approaching twice the pixel pitch in either axis.

As already mentioned, other orbit methods and CFA patterns are compatible with this invention. For example, in the pending patent application mentioned above, I describe a shifting method to suppress color aliasing when using the Bayer pattern that requires just two exposures. The essence of the method is shown in FIG. 13. FIG. 13A shows the familiar Bayer pattern, FIG. 13B shows the shift pattern consisting of a single shift in the X direction (though a Y direction shift would achieve the same result). The resulting color data coverage is shown in FIG. 13C, and it can be seen that all of the green data are present, but only 50% of the red and 50% of the blue data. Fortunately, and according to the information laid out in the present application, it is possible to interpolate the missing red and blue data by using the green data as a luminance map to avoid color aliasing and to meet Nyquist resolution limit. Thus, this alternate CFA color shifting approach meets the objective of producing three sets of fully packed color data essentially identical to the data that would be produced from three separate global color-filtered exposures. This two-exposure orbit makes the present invention even more attractive, since it reduces the number of exposures per shift position from four to just two when using the preferred Bayer pattern. This is fewer exposures than the alternate embodiment, which requires three exposures per shift position. Such exposure reductions significantly increases the productivity of the camera.

Many permutations of shift order, shift direction, and CFA pattern yield the same final result, and it is not intended that the illustration of the invention by way of the foregoing specific directions and order of execution limit the scope of the invention.

Preferred De-Convolution Expression

Since the isolated fully packed color data sets are identical whether recorded using globally filtered monochrome array 22, or CFA 21, the following description of the preferred de-convolution expression applies across all embodiments.

It is sufficient to consider one fully packed single color data set, since the following operations will apply to the other single color data sets identically. Take first the example of resolution-quadrupling, other orders of resolution-enhancement will be generalized in a later section.

Figure 15:
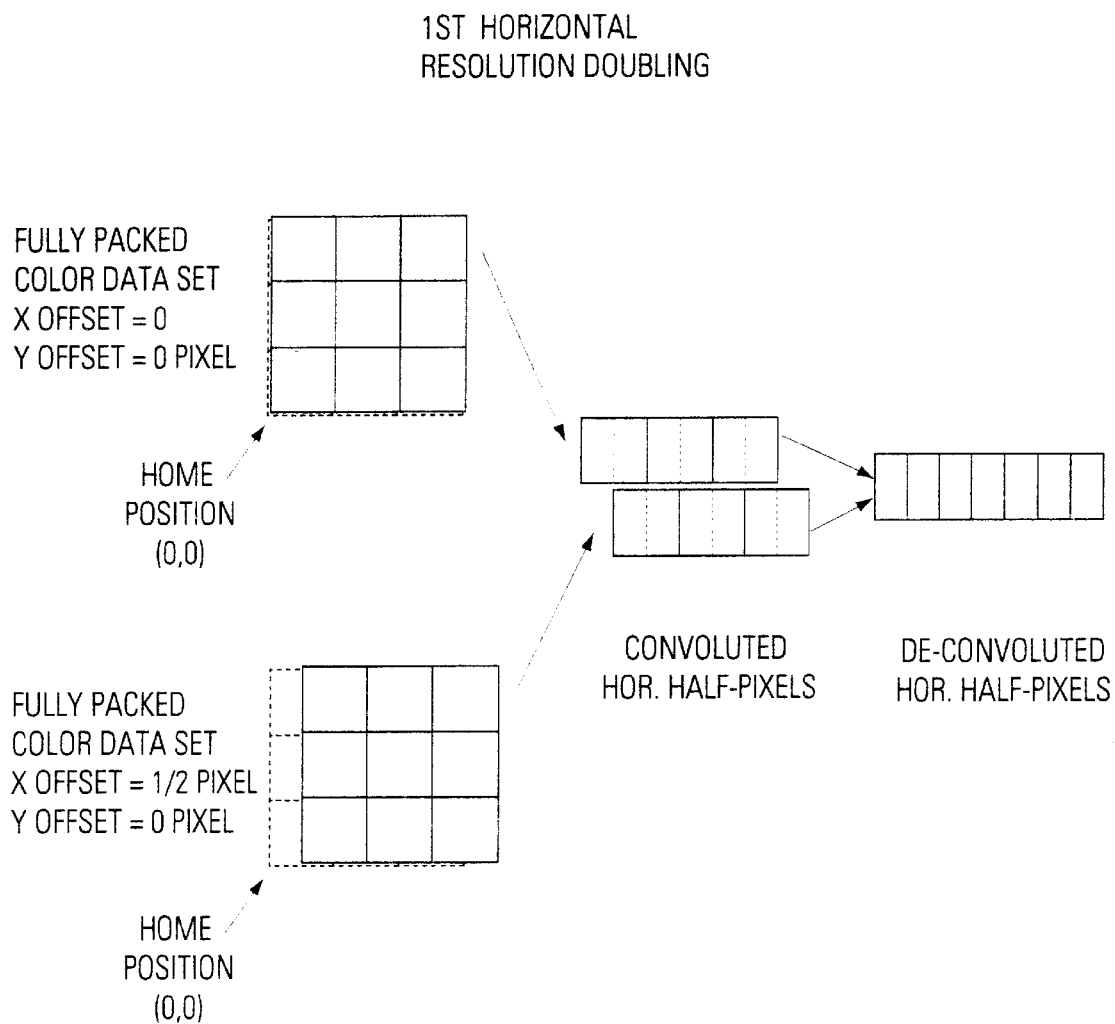
FIG. 15 illustrates the first step of data de-convolution for the case of resolution-quadrupling.
Figure 16:
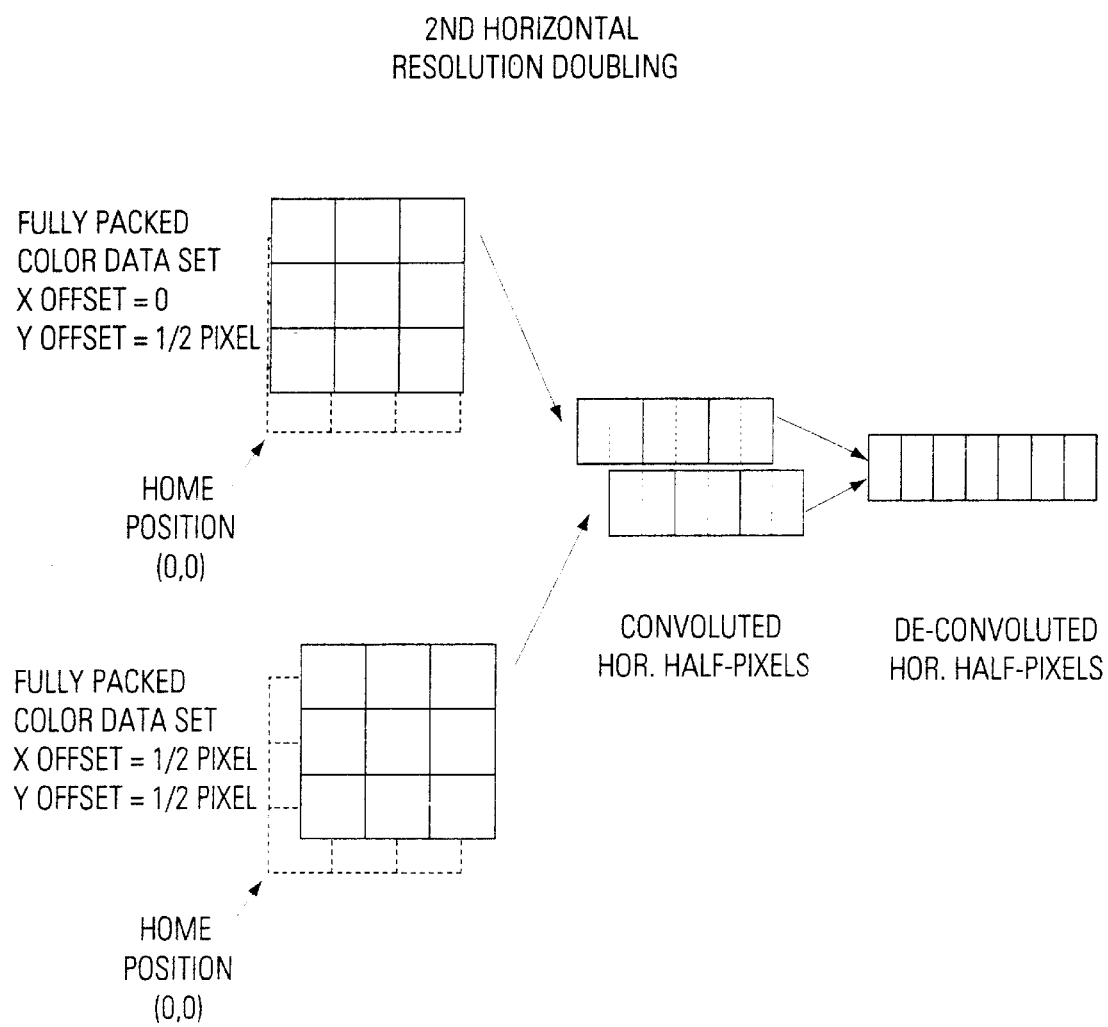
FIG. 16 illustrates the second step of data de-convolution for the case of resolution-quadrupling.

Referring to FIG. 14, after a resolution-quadrupling procedure has been completed, there exist four sets of fully packed single color data—one offset from the other horizontally by ½ a pixel. Such data are produced by the means outlined previously. Next, the data sets are paired by equal Y offset though the same result is possible if the data sets were paired by equal X offset. FIG. 15 shows the first such pair: (0,0) and (½, 0). A given row of pixel data, say the first row, from the unshifted array is paired with the corresponding row from the shifted array. Each row of pixel length $N_x$ can now be visualized as being composed of $2N_x$ cells. The unshifted and shifted rows overlap and it is possible to de-convolute the data contained in these rows to create a single row of $2N_x+1$ elements. The details of the de-convolution expression will be described shortly. After all such paired rows have been de-convoluted, a new array of single color data exists that is $(2N_x+1)\times(N_y)$ cells and that is not offset in the Y direction. Next, and referring to FIG. 16, the other pair of data sets are treated in the same way yielding another array of data of size $(2_{No}+1)\times(N_y)$ displaced ½ pixel in the Y direction.

Figure 17:
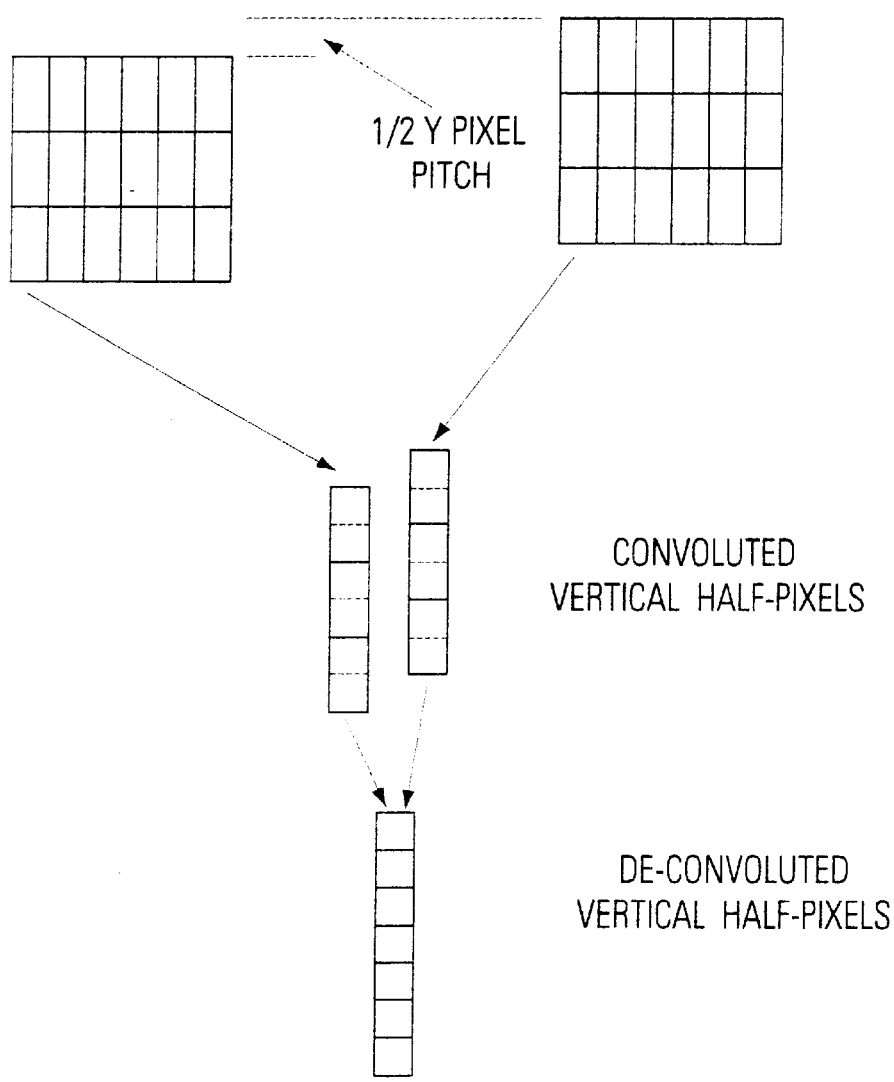
FIG. 17 illustrates the third and final step of data de-convolution for the case of resolution-quadrupling.

Now we are ready to finish the resolution-quadrupling. Referring to FIG. 17, it can be seen that there is a symmetry between the relationship of the two horizontal resolution-doubled color data sets and of any two original color data set pairs: both sets of paired data are mutually offset by one half a pixel. So one final de-convolution between resolution doubled color data set pairs applied in the same manner as was to the first shifted color data set pairs yields our goal of resolution doubling in both axes for all colors.

These procedures and the associated expressions can be generalized to any order of resolution-enhancement. In the general case, single color data sets are grouped according to, say, the Y offset. These groups are each de-convoluted to produce horizontally resolution-enhanced data sets that are mutually offset in the X direction. These data sets are de-convoluted once more to yield the final high resolution array sought.

FIG. 18 describes a procedure that can be used to calculate the electron response of the pixels as a measure of brightness. A better procedure for obtaining pertinent illumination data is reflected in the preferred de-convolution expression shown in FIG. 19. This preferred de-convolution procedure calculates a normalized electron response, an illumination response, independent of pixel size of the particular imager that is used in a camera.

As explained in the previous section, the preferred method of de-convolution is a two-step procedure. The preferred de-convolution expression is applied first to one dimension of the matrix of color data and then to the other dimension, so as to produce a two-dimensional matrix of de-convoluted resolution-enhanced data. As illustrated by the expressions shown in FIG. 19A and FIG. 19B, the expression is configurable to de-convolute data to any order of resolution-enhancement (assuming that the proper data sets exist) and can be further configured to favor a certain convergence accuracy or convergence rate. The generalized preferred de-convolution expression, as shown in FIG. 19C, is as follows:

$$R_n = \begin{cases} P_n + f\left(kP_{n-(k-1)} - P_n - \sum_{i=1}^{i=k-1} R_{n-1}\right) & 0 < R_n < S \\ 0 & R_n < 0 \\ S & R_n > S \end{cases}$$

Decreasing One-ended $$R_n = \begin{cases} P_{n-(k-1)} + f\left(kP_n - P_{n-(k-1)} - \sum_{i=1}^{i=k-1} R_{n-1}\right) & 0 < R_n < S \\ 0 & R_n < 0 \\ S & R_n > S \end{cases}$$

where $P_n$ = input pixel $R_n$ = result pixel $k$ = order of resolution enhancement $f$ = convergence factor $S$ = upper data limit The optimum result is obtained when the desired degree of accuracy or convergence rate is determined, then the convergence factor set accordingly. The expression may, however, be configured so as to modulate the convergence according to the local contrast, "local contrast" being the difference in intensity between two adjacent pixels. In other words, the expression can be configured to increase the convergence factor after the occurrence of local contrast peaks, i.e., a pixel of very high intensity is located between pixels of low intensity. This "adaptive convergence" attenuates the subsequent so-called "ringing" in the error values arising in conjunction with sudden occurrences of high-intensity values amidst low-intensity values. Note that in all cases a test is performed after each iteration for violation of data bounds. The data are typically bounded by zero and the upper limit of the ADC, or some scaled version of the A–D upper limit. This information is used to accelerate convergence when the iteration under consideration has calculated what is known to be an out-of-bounds result. The increasing and decreasing de-convolution expressions are applied sequentially to each data set. First, the increasing expression is applied in increasing sequence of the data set, starting from pixel #1, to generate a stream of result data ($R_n$) for a given row. The first k 'results' (k being the order of resolution-enhancement) cannot be calculated and are simply seeded from the original pixel data. The result data then subsequently converge as n increases. Next, the decreasing expression is applied in decreasing sequence, starting with pixel #n, to generate another stream of result data. Again, the first k results cannot be calculated, but can be seeded from the last k calculations from the increasing expression, thus avoiding the convergence period. The two results are combined by simple averaging in a pixel-by-pixel fashion, except when n is in the region where the increasing expression was not fully converged. In that region, the result data from the decreasing expression are preferred (for example, by an increasingly weighted average). The increasing expression is fully converged after approximately 1/(1-f) pixels have been processed.

While a Preferred Embodiment is disclosed herein, this is not intended to be limiting. Rather, the general principles set forth herein are considered to be merely illustrative of the scope of the present invention and it is to be further understood that numerous changes may be made without straying from the scope of the present invention.

What is claimed is:

1. Method for resolution enhancement of a still-image of a subject made by a digital imaging device using an array of discrete light-sensitive sensors, said array being oriented on a plane that extends along a first axis and a second axis, said second axis being transverse to said first axis, each of said light-sensitive sensors being a natural pixel having a first-axis dimension along said first axis and a second-axis dimension along said second axis, and said sensors being arranged in said array in a plurality of first-axis rows and a plurality of second-axis rows, said method comprising the steps of:

(a) determining a desired order of resolution enhancement and a sequence of positions of said array of said sensors that is required to obtain said desired order of resolution enhancement, said sequence comprising a first position and one or more shifted positions along said first axis and/or said second axis, each shifted position of said one or more shifted positions being displaced from an adjacent position in said sequence by a distance less than said first-axis dimension when displaced along said first axis and less than said second-axis dimension when displaced along said second axis;
(b) forming a first image of said subject on said array at said first position and recording a data set of said first image on a data carrier, said data set including data from each sensor of said array, and said data set of said first image being a first data set;
(c) shifting said array of said sensors from said first position to said shifted position;
(d) forming a shifted-position image of said subject on said array of said sensors at said shifted position and recording a shifted-position data set of said shifted-position image onto said data carrier;
(e) convoluting said first data set and said shifted-position data set to obtain a plurality of convoluted first-axis data sets, said plurality of convoluted first-axis data sets corresponding in number to said plurality of first-axis rows, wherein said convoluting comprises the steps of:
(e1) forming sub-groups of first-axis-aligned data sets by grouping said convoluted first-axis data sets according to each said shifted position of said array along said first axis;
(e2) combining a first first-axis row of data from each one of said sub-groups to obtain a first convoluted first-axis data set, analogously combining a second first-axis row of data from each one of said sub-groups to obtain a subsequent convoluted first-axis data set, and repeating this step until a convoluted first-axis data set has been obtained for each corresponding row of said plurality of first-axis rows of said array;
(f) deconvoluting said convoluted first-axis data sets into resolved data sets by applying a first-axis deconvolution expression to said first convoluted first-axis data set to obtain first-deconvoluted first-axis image data that is resolution-enhanced and digitally processable, and repeating this step analogously for each subsequent convoluted first-axis data set of said first-axis-aligned data sets to obtain corresponding subsequent-deconvoluted first-axis image data that is resolution-enhanced and digitally processable;
(g) forming new groups of said first-axis-aligned data sets by re-grouping said first data set and said shifted-position data set for each said shifted position of said array to obtain first-convoluted, second axis data sets, said first-axis-aligned data sets now including deconvoluted, digitally processable image data for said first-axis rows; and
(h) obtaining fully deconvoluted data sets by first convoluting each second-axis row of data sets from said new groups to obtain a plurality of said first-convoluted, second-axis data sets, then applying a second-axis deconvolution expression to each one of said first-convoluted, second-axis data sets to obtain fully deconvoluted, resolution-enhanced digitally processable image data.

2. The method described in claim 1 wherein said method is carried out to any desired order of resolution-enhancement, said desired order of resolution-enhancement being an arithmetic product of a first-axis factor of resolution-enhancement and a second-axis factor of resolution-enhancement, said first-axis factor of resolution-enhancement being the number of said shifted positions along said first axis plus one, and said second-axis factor of resolution-enhancement being the number of said shifted positions along said second axis plus one, and wherein a first-axial shift is an axial displacement of said array of discrete light-sensitive sensors on said first axis by a first fraction of said first-axis dimension of said natural pixel, said first fraction being a reciprocal of said first-axis factor of resolution-enhancement, and wherein a second-axial shift is an axial displacement of said array of discrete light-sensitive sensors on said second axis by a second fraction of said second-axis dimension of said natural pixel, said second fraction being a reciprocal of said second-axis factor of resolution-enhancement.

3. The method of claim 2, wherein said steps of shifting said array of said sensors, forming said shifted-position image, recording said shifted-position image on said data carrier, and convoluting said first data set and said shifted-position data set include shifting said array through each one of said one or more shifted positions and correspondingly forming shifted-position images and recording shifted-position data sets for each one of said shifted positions, and wherein said step of convoluting said first data set and said shifted-position data set includes convoluting said first data set and said shifted-position data set for said each one of said shifted positions.

4. The method as claimed in claim 1, wherein said still-image is a color still-image and said array of discrete light-sensitive sensors is a large-aperture-ratio sensing array providing an aperture ratio approaching 100%, said method comprising suppressing color-aliasing by obtaining fully-packed color data for each of three primary colors in said pixels.

5. The method as claimed in claim 4 further comprising:
(a) using a color filter matrix to obtain said color data;
(b) determining an orbit for isolating and filtering separately for each of said three primary colors, said orbit including a color-orbit home position and whole-pixel-shift positions;
(c) recording a color data set for said primary colors, wherein said color data set is said data set having color image data recorded at said color-orbit home position and at each of said whole-pixel-shift positions of said orbit before shifting said large-aperture-ratio sensing array to a next said shifted position in said sequence of positions.

6. The method as claimed in claim 5, wherein said color filter matrix is a Bayer-pattern filter having an array of one of sites, each site filtering for one of said three primary colors and corresponding in size to said pixel, said Bayer-pattern filter being integrated into a charge-coupled-device that is a color-filtered-array, and wherein said large-aperture-ratio sensing array Is said color-filtered-array, said method further comprising:
(a) providing a single-exposure preview mode with full color; and
(b) prior to recording each said color data set, isolating and fully packing and then recording color data in color-enhancing exposures.

7. The method as claimed in claim 6, wherein said method provides a four-exposure color-enhancing orbit for obtaining isolated and fully-packed color data, and wherein said step of isolating and fully packing of color data further includes the steps of:
(a) determining said four-exposure color-enhancing orbit that will enable recording said color data of each of said three primary colors in each said pixel without overlapping of said sites, said four-exposure color-enhancing orbit having color-orbit positions that include a color-orbit home position and three whole-pixel shift positions of said color-filtered-array so as to record 100% color data of a first color, 100% color data of a second color, and 200% of color data of a third color onto each of said pixels;

(b) recording said color data set containing said color data of each of said three primary colors by shifting and exposing said color-filtered-array at each of said color-orbit positions at said first position of said sequence of positions;

(c) shifting said color-filtered-array to one of said shifted positions in said sequence of positions;

(d) recording said color data set containing said color data of each of said three primary colors by shifting and exposing said color-filtered-array through each position of said four-exposure color-enhancing orbit;

(e) repeating steps (c) and (d) until said color-filtered-array has been shifted to each of said positions of said resolution-enhancement sequence of positions and said color data set has been recorded at each said shifted position.

8. The method as claimed in claim 5, wherein said three primary colors include a first color that is red, a second color that is green, and a third color is blue.

9. The method as claimed in claim 8, wherein said method provides a two-exposure color orbit for obtaining color data, green being filtered in 50%, blue in 25%, and red in 25% of said sites, said method including the steps of:

(a) prior to executing said resolution-enhancement of said still-image, recording said color data of a first exposure of said color-filtered-array;

(b) shifting said color-filtered-array one whole pixel, either on said first axis or said second axis;

(c) recording said color data from a second exposure of said color-filtered-array to obtain said data set, said data set containing green color data and red color data in 50% of said pixels, and green color data and blue color data in another 50% of said pixels;

(d) interpolating values for missing blue color data or missing red color data, respectively, in said color data sets;

(e) assembling a composite color image of said still-object by comparing interpolated values of said missing blue color data and said missing red color data, respectively, with measured values of a blue-green intensity ratio or a red-green intensity ratio, respectively, contained in neighboring pixels; and (f) interpolating color values that correspond most closely with said measured values of respective intensity ratios.

10. The method as claimed in claim 9, wherein said sensing array is an unfiltered, large-aperture-ratio sensing array providing an aperture ratio approaching 100% and said color filter matrix is a monochrome filter, and wherein said method provides a three-exposure process for obtaining color data, said method including the steps of:

(a) prior to executing a resolution-enhancement sequence of positions, placing a first monochrome filter in front of said sensing array, said first monochrome filter passing a first color only of said three primary colors;

(b) taking an exposure of said still-image at a particular home position of said resolution-enhancement sequence of positions and recording a color data of said first color;

(c) repeating steps (a) and (b), whereby said first monochrome filter is replaced with a second monochrome filter for one repetition and said second monochrome filter is replaced with a third monochrome filter for a second repetition; and (d) shifting said large-aperture-ratio sensing array to a next said shifted position in said resolution-enhancement sequence of positions;

wherein a sequence of exposing said large-aperture-ratio sensing array through said first monochrome filter, said second monochrome filter, and said third monochrome filter is irrelevant for recording a complete color data set.

11. The method of claim 1, wherein said first-axis deconvolution expression or said second axis deconvolution expression is applicable to any order or resolution-enhancement of said still-image and includes parameters that result in a rapid convergence of error values of said convoluted data sets.

12. The method of claim 3, wherein said sequence further comprises one or more second-axis shifted positions along said second axis and wherein said steps of forming said shifted-position image and recording said data set of said shifted-position image include forming a send-axis shifted-position image corresponding to each one of said one or more second-axis shifted positions, and recording on said data carrier a second-axis shifted-position data set corresponding to each said second-axis shifted-position image that is formed.

13. The method of claim 1, wherein said digital imaging device is a digital camera.

14. The method of claim 1, wherein said digital imaging device is a digital scanner.

* * * * *